United States Patent [19]
Zaremba

[11] Patent Number: 5,887,384
[45] Date of Patent: Mar. 30, 1999

[54] PANEL PLANTER

[76] Inventor: George Julian Zaremba, 6630 N. Kostner Ave., Lincolnwood, Ill. 60646

[21] Appl. No.: 679,420

[22] Filed: Jul. 8, 1996

[51] Int. Cl.⁶ ..................................................... A01G 9/02
[52] U.S. Cl. ............................................... 47/65.5; 47/68
[58] Field of Search ............................... 47/39, 40, 66.1, 47/65.5, 68

[56] References Cited

U.S. PATENT DOCUMENTS

| | | | |
|---|---|---|---|
| 4,559,738 | 12/1985 | Helfman | 471/66.1 |
| 4,640,045 | 2/1987 | Nesbitt et al. | 47/39 X |
| 4,698,936 | 10/1987 | Helfman | 47/40 X |
| 4,897,958 | 2/1990 | Brydges | 47/68 |
| 5,177,899 | 1/1993 | Powell | 47/65.5 |
| 5,368,266 | 11/1994 | Allen | 47/39 X |
| 5,664,367 | 9/1997 | Huang | 47/40 |

*Primary Examiner*—John A. Ricci
*Attorney, Agent, or Firm*—Adrienne B. Naumann

[57] ABSTRACT

A planter box for installation on the top of a narrow horizontal surface such as the top of a movable room partition or panel includes a lower surface with at least one pair of side-by-side, circular depressions. Each depression includes serrations around its periphery. A rectangular connector with serrations complementary to the serrations of a respective depression at its short ends, and a downwardly depending peg, is frictionally inserted in each depression at an angle such that, when the box rests on the top of the panel, one peg extends downwardly on each side of the panel in close relation, but not contacting the panel. A wedge member is provided for each peg, each wedge member including a block with a friction surface to contact a respective panel side, and a slanted slot to receive a respective peg, such that as each wedge member is slid along a respective peg in a direction parallel to the panel top, the friction surface of each wedge member will be brought into frictional contact with a respective panel side to hold the planter box in place.

6 Claims, 5 Drawing Sheets

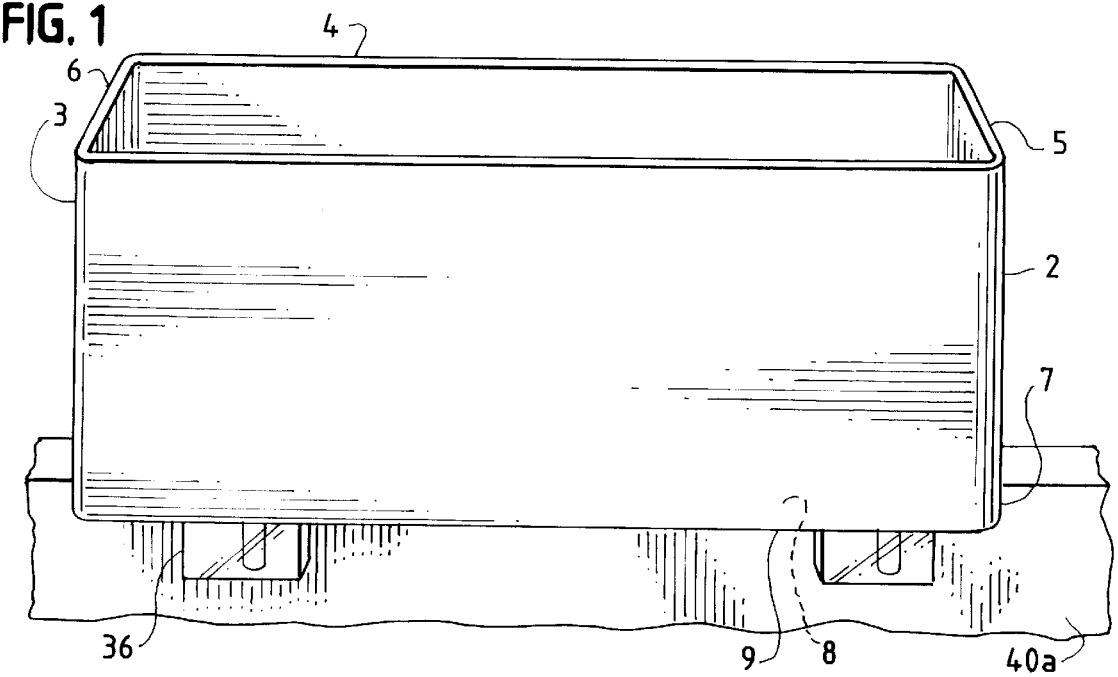
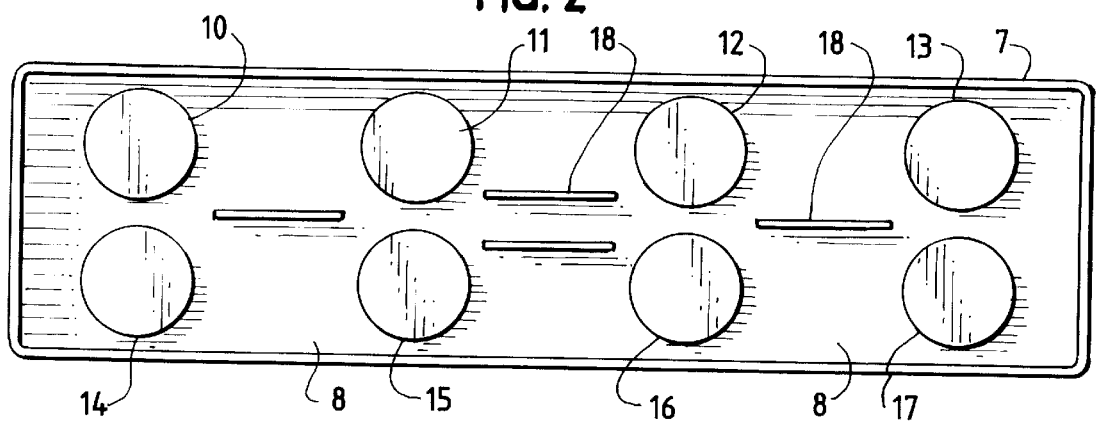
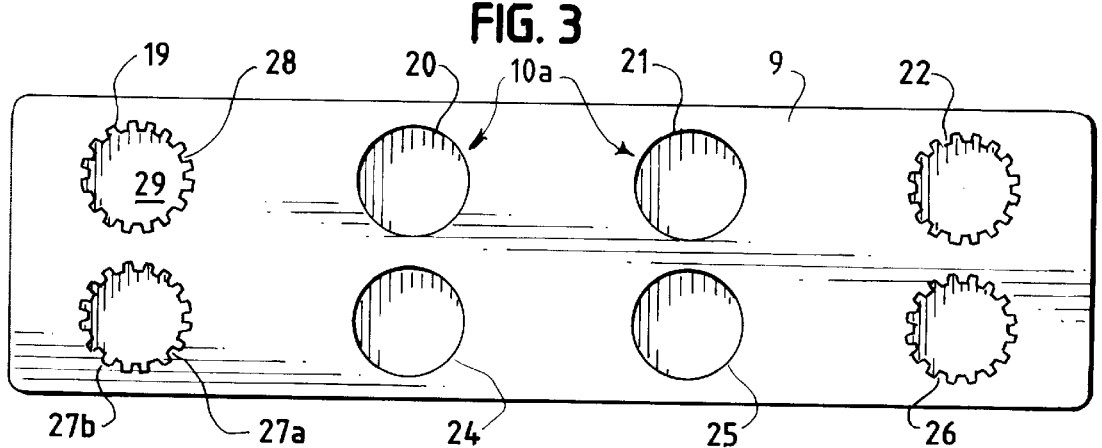

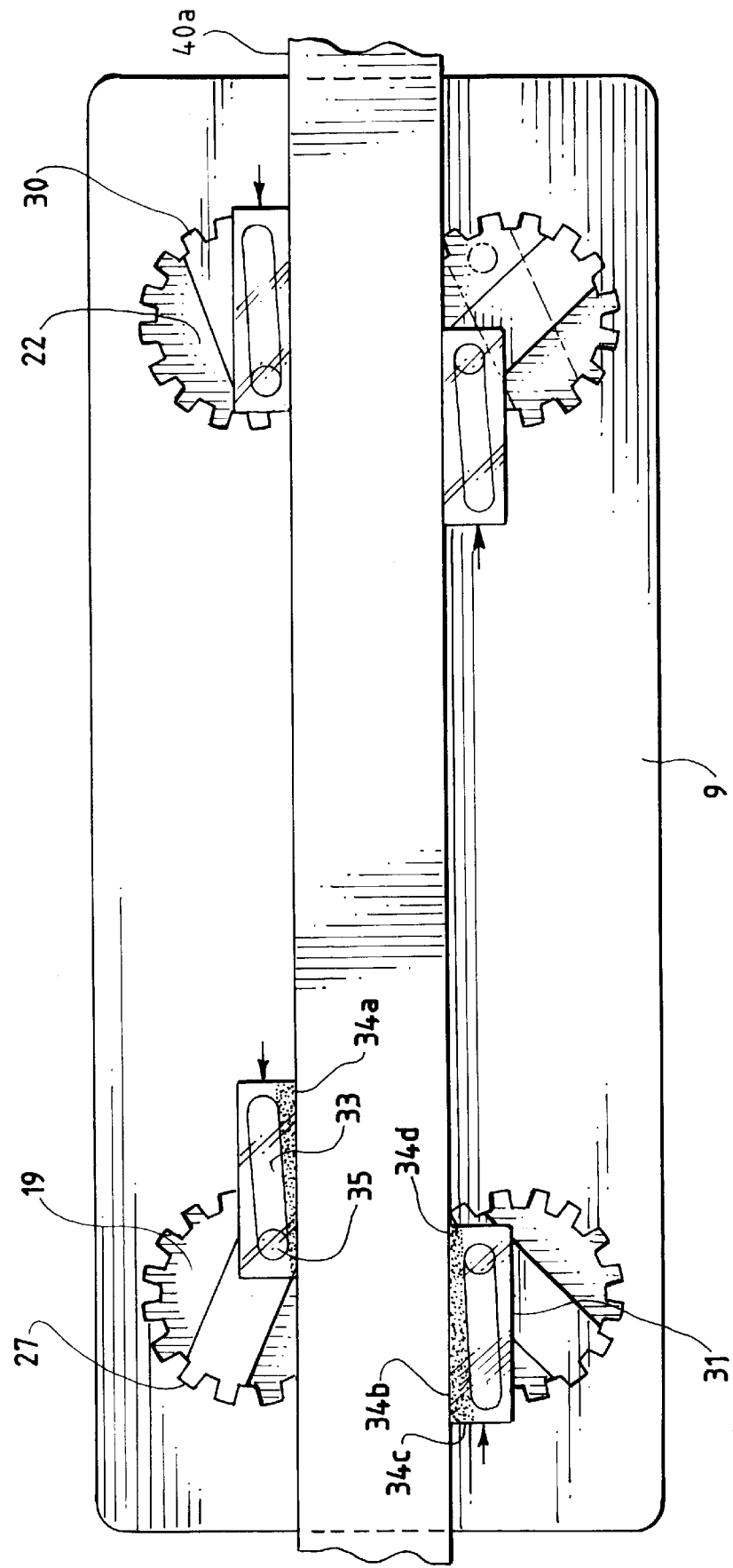

TABLE (IN INCHES)

1A.....1      - 1 1/4
1B.....1 1/4 - 1 3/8
2B.....1 3/8 - 1 1/2
2C.....1 1/2 - 1 3/4
3C.....1 3/4 - 1 7/8
3D.....1 7/8 - 2 1/8
4D.....2 1/8 - 2 1/4
4E.....2 1/4 - 2 1/2
5E.....2 1/2 - 2 3/4
5F.....2 3/4 - 2 7/8
6F.....2 7/8 - 3 1/8
6G.....3 1/8 - 3 1/4
7G.....3 1/4 - 3 1/2
7H.....3 3/8 - 3 5/8
8H.....3 5/8 - 3 3/4
8 I.....3 3/4 - 4
9 I.....3 7/8 - 4 1/8
9J......4       - 4 1/4
10J......4 1/4 - 4 3/8

PANEL PLANTER

BACKGROUND OF THE INVENTION

My invention relates to a structure which functions as an elevated stand and container for floral arrangements and plants. More particularly, the present invention, hereinafter referred to as the panel planter, relates to a box which holds flower or plant arrangements while reversibly fastened to the top of a, for example, free standing wall panel, room partition, or any generic wall member. In the preferred embodiment the box interior contains circular raised areas on which to place potted plants, so they can drain properly after being watered. However, these features are not a requirement and objects other than plants and flowers can be placed in the box.

There has been a long-standing need in the floral industry for a modular flower or plant display stand for indoor and outdoor environments. My panel box is easily engaged by a wedge and peg attachment mechanism, so it is easily moved from panel to panel. There are also constraints of weight, costs and rigidity of existing planters and boxes which cannot easily be moved, grouped or rearranged individually within practical cost and time constraints.

My panel planter is easily engaged by devices, hereinafter referred to as attachments, these attachments further comprised of wedge members and peg members. Using these attachments, a planter box is easily tightened to fit the contour of a panel or other narrow horizontal surface of any generic wall member.

Others have suggested numerous display devices for holding plants or flowers securely atop a fence or panel. For instance, U.S. Pat. No. 4,015,545 (Stankowitz) discloses a support bracket designed to be mounted between and supported by wall partitions. The support bracket is incapable of supporting anything except the lightest of objects, such that heavy plants could not be placed in the container.

U.S. Pat. No. 4,415,091 (Wolff) discloses a plurality of wall partitions joined together at their vertical edges. A beam member is supported at each of its end edges with a hanger which is inserted between the wall partitions where they join together. Various kinds of racks are designed to be securely suspended from one or more beams. However, the racks project a substantial distance from the partition walls and would make already crowded work conditions deteriorate.

U.S. Pat. No. 4,559,738 (Helfman) discloses three prototypes of a planter: (1) one which attaches to the top of a partition wall by a groove in the bottom surface of the planter; (2) one which attaches to the top by brackets; and (3) one which hangs from the partition by means of brackets or an extension of the planter designed to hook over the top of the partition wall.

However, the numerous prototypes of Helfman's brackets lack the flexibility, adaptability, and strength of my novel attachment. In the preferred embodiment my invention is comprised of two freely movable parts made of clear lucite or polyethylene. My invention comprises no brackets of any kind whatsoever.

By locking a peg member into a wedge member, this unique structure, hereinafter referred to as the attachment, in turn fits into the serrated(comprised of ridges and valleys) surface of the bottom of the planter. Four of such attachments, when strategically placed in the preferred embodiment, can grasp the top of any wall member, such as a railing, partition, or shelf. However, for an elongated or differently shaped planter, more or fewer attachments are within the scope of this invention.

My panel planter is rigidly fastened, but it can be easily removed and relocated. In the preferred embodiment the cost of my panel box is economical, being made of lightweight plastic and clear rigid polypropylene attachments. However, other materials are suitable, such as plastics, wood and metals. These materials are also within the scope of my invention, especially for use of the panel planter in an outdoor environment.

In sum, none of the foregoing display structures have attachments, comprising peg and wedge members, which easily and rigidly support a series of flower pots atop a panel or fence or other wall member. With my invention, the rectangular box can hold several flower or plant arrangements in a leakproof, watertight manner. My box also allows drainage so that roots emanating from the holes at the bottom of flower pots can reach the appropriate level of moisture.

Alternatively, the box can be filled with soil or water and the plants and/or flowers need not be confined to pots.

The above summarizes the preferred embodiment of my invention. In another embodiment, there is a specially graded circular template system. The attachments are easily adjustable to any width for a surface of a wall member: between approximately four and one quarter inches and approximately one and one quarter inches in the preferred embodiment. This template system correlates the orientation of the attachments to the width of the wall member, as described in more detail below.

In sum, coding templates for positioning the attachments are also within the scope of my invention. The templates correspond to serrations(ridges and valleys), on the lower surface of the planter box. The coding system of the templates brings the attachments to within approximately one eighth of an inch of a respective side of a wall member.

SUMMARY OF INVENTION

To solve this long-standing problem in the art, the present invention, hereinafter referred to as 'the panel planter,' provides an improved attachment mechanism for plant boxes. Use of these attachments is appropriate on top surfaces of porch banisters, indoor movable wall panels, or other wall members. surfaces.

An operator can manually arrange flowers, plants, and other decorations in separate pots and place them in the box and assemble the attachments quickly. The attachments, in the preferred embodiment, consist of clear plastic peg members and wedge members. The wedge members contain slanted slots in which the peg members can easily slide and then tightly fit. Ridges on the assembled attachment fit into ridges on the box's lower surface.

Accordingly, an object of my present invention is to provide an improved panel box for floral arrangements that prevents slippage of the box when it is filled with plants and flowers.

Another object of my present invention is to provide an improved, stronger yet lightweight box made from durable low cost materials to support floral or plant arrangements, or in general to serve as a container.

Yet another object of the present invention is to provide at least four peg members and wedge members to form attachments which can be attached to the bottom surface of the box, using a template system.

Another object of the invention is to have a flat bottom of the planter box with circular raised areas so that pots may drain into the lower areas of the box.

Another object of the invention is to have additional supports for the pots along the floor of the box, constructed as raised plastic strips.

Another object of the invention is to create a planter which contains four circular serrated (ridges and valleys) impressions on its bottom surface into which ridges as components of removable attachments can interlock.

Another objection of the invention is to create a planter box which uses plastic peg members which slidably fit into wedge members forming attachments, which grasp the sides of a wall member.

These and still other objects and advantages of the invention will become apparent from the following description and drawings of the preferred embodiment of the present invention.

BRIEF DESCRIPTION OF THE DRAWINGS

My invention may be better understood by reference to the drawings accompanying this specification:

FIG. 1 is a front side view of the planter box with attachments.

FIG. 2 is a plan view of a lower surface of a planter box with depressions.

FIG. 3 is a plan view of the lower surface of a planter box with ridges and valleys on the perimeters of depressions.

FIG. 7 is a plan view of the lower surface of planter box floor with attachments with interlocking ridges within depressions.

DETAILED DESCRIPTION OF THE INVENTION

Figure 4A:
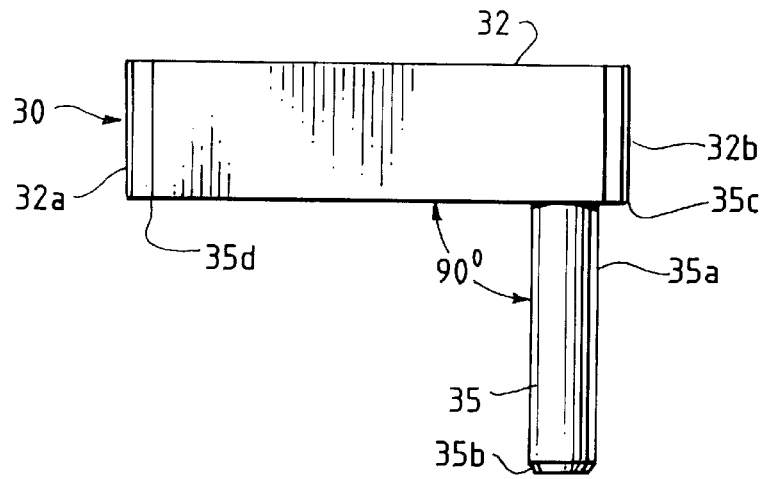
FIG. 4a is a side view of a peg member.

My present invention, the panel planter 1, is actually a modified plant box for rigid attachment to a structure such as the top surface of an indoor room panel, railing or any other wall member wherein a "flower box" is desired. In the preferred embodiment my planter is rectangular and slightly wider than the top of a wall member. However, the scope of my invention includes other shapes and sizes as well.

Although the preferred embodiment of my planter box is made of plastics, the planter can be made of metal, synthetic resin or wood. If a metal is used to make the planter, preferably a non-oxidizing metal is employed. Plastics that can be molded or die cast are preferred, such as acrylic, polystyrene, polyethylene, polyvinylchloride, polytetrafluoro-ethylene(teflon), polymethymethacrylate (plexiglas or lucite) polypropylene, or polycarbonate.

Synthetic resins include nylon, rayon, dacron, formic, fiberglass, polyester, phenol formaldehyde, phenolfurfual, urea formaldehyde and the like. If wood is used it should be coated with plastic or paint to prevent rot and retain moisture for the plants. A wood finish or a paper or fabric cover is also within the scope of my invention. The attachments in the preferred embodiment are generally comprised of lucite or solid acrylic.

Again referring to FIG. 1, especially with respect to indoor environments, the box must be rigidly attached so that it does not tip or fall, even if it is unevenly balanced by the contents. The results is that the entire box will not slip and injure a person working beneath, for example, a panel component of a cubicle or interior room.

As seen in FIG. 1, in the preferred embodiment the box in conjunction with the attachments comprise my invention 1. In the preferred embodiment, the floral or plant arrangements are in pots which are placed directly inside a rectangular box 2. The thickness of walls 3, 4, 5, 6, at right angles to a horizontal surface is approximately 0.5 inch. In the preferred embodiment the height of the upwardly protruding parallel walls comprising box 2 is approximately seven inches. The horizontal length of the longer walls (length) is approximately 25 inches, and the width is approximately seven inches (two shorter walls). However, other dimensions and shapes are within the scope of my invention.

Again referring to FIG. 1, floor 7 of box 2 rests upon the horizontal surface of wall member 40a. Floor 7 is approximately 1.0 inch in thickness. It has an upper surface 8 and lower surface 9.

As shown in FIG. 2, in the preferred embodiment there are eight upwardly protruding raised circular areas specifically depicted in FIG. 2 as: 10, 11, 12, 13, 14, 15, 16, 17. These areas are injection molded with plastic on upper surface 8. These areas are approximately three inches in diameter and are arranged in two parallel rows of four each. However, fewer or more, or absence of such circular areas are also within the scope of my invention.

In between these circular areas are plastic strips 18. These strips are approximately three quarters of an inch in height and protrude upwardly from upper surface 8. In the preferred embodiment, there are five such strips, but more, fewer or no strips are within the scope of my invention.

Referring now to FIG. 3, in the preferred embodiment, the lower surface 9 of box 2 comprises eight circular depressions, generically referred to as 10a, and specifically illustrated as: 19, 20, 21, 22, 23, 24, 25, 26. Depressions 10a are approximately three quarters of an inch in depth and approximately two and three quarters inches in diameter.

Again referring to FIG. 3, depressions 10a form two parallel lines in the preferred embodiment and are also simultaneously aligned in pairs. This allows wall member 40a to fit linearly between each pair of depressions 10a. Each of the two outer pairs of depressions 10a contain ridges 27a and valleys 27b as integral components of their circumferences. Ridges 27a within each depression 10a are parallel to each other and reach from top edge 28 of each depression 10a to base 29(not shown).

In the preferred embodiment the width of a single ridge 27a within a circular depression as described supra, is approximately one tenth of an inch. More than, or less than four serrated (ridges 27a and valleys 27b) areas, of different shapes and sizes are also within the scope of my invention. For example, for an extremely elongated box, all four pairs of circular depressions 10a can be serrated (with ridges and valleys) to cooperate with additional attachments (see infra).

Other numbers and/or combinations of serrated (ridges 27a and valleys 27b) and nonserrated depressions 10a in lower surface 9 are also within the scope of my invention.

Referring now to FIG. 4a, peg member 30 in the preferred embodiment comprises a cylindrical rigid protruding component 35. Component 35 has an upper end 35a, which is embedded at a right angle to a rigid rectangular straight segment 32. Component 35 also has a lower end 35b with a flat surface.

Figure 4B:
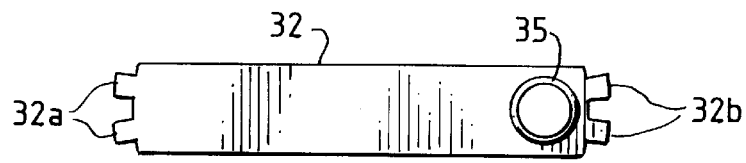
FIG. 4b is an upper plan view of a peg member with ridges.

Peg member 30 also comprises rectangular segment 32. Rectangular segment 32 has a first end 35c and a second end 35d, as seen in FIG. 4a. As seen in FIG. 4b, in the preferred embodiment there are two protruding ridges 32a and an additional two protruding ridges 32b at either end 35c, 35d of straight rectangular segment 32. Rectangular segment 32 also has an upper segment and a lower segment.

In the preferred embodiment ridges 32a, 32b on peg member 30 can interlock tightly with opposing serrations 27 (ridges 27a and valleys 27b) of depressions 10a. As mentioned supra, ridges 27a and valleys 27b are structurally part of perimeters of each depression 10a in lower surface 9. See FIG. 3.

Figure 5A:
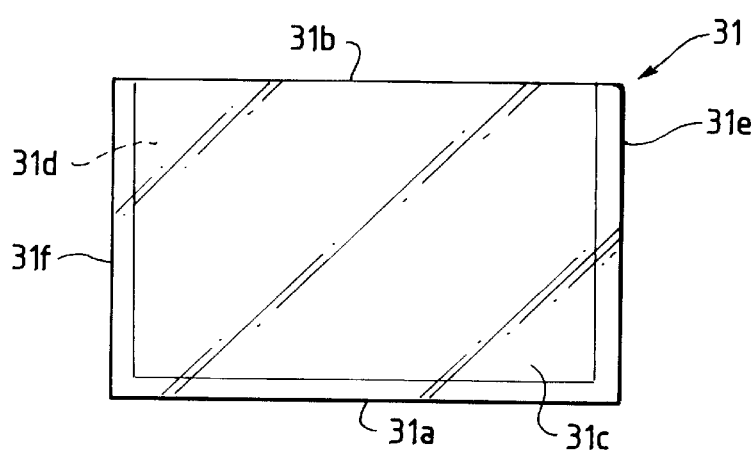
FIG. 5a is a side view of a wedge member and a peg member forming an attachment.

Referring now to FIG. 5a, in the preferred embodiment wedge member 31 is approximately three quarters of an inch in width, approximately three inches in length and approximately one and three quarters inch in height. In the preferred embodiment there is a bottom segment 31a, top segment 31b, two side segments 31e and 31f, and two flat vertical parallel rigid sides 31c and 31d.

Figure 5B:
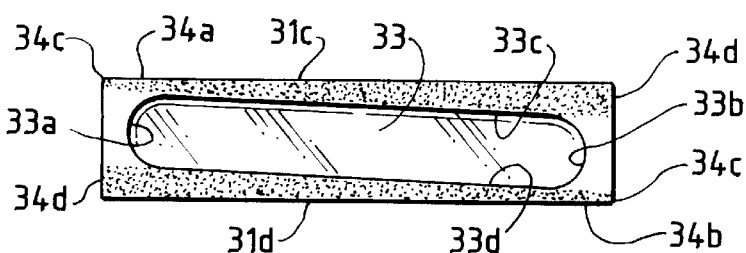
FIGS. 5b and 5c are upper plan views of wedge members.
Figure 5C:
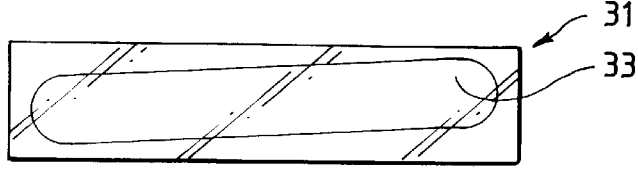

Referring to FIGS. 5b and 5c, wedge member 31 contains a slanted slot 33 with opposing ends 33a and 33b. In the preferred embodiment these ends are rounded. Slot 33 extends from slightly above bottom segment 31a and opens upwardly and exteriorly through top segment 31b.

Again referring to FIGS. 5b and 5c, slot 33 has two parallel faces, 33c and 33d. Each of these two faces 33c and 33d, in turn, form one side of a prismoidal wedge 34a or 34b. These wedges 34a and 34b are also delineated by parallel sides 31c and 31d. In the preferred embodiment two prismoidal wedges 34a, 34b, each having an apex 34c and a base 34d, are juxtaposed to each other on opposite sides of slot 33 in a single wedge member 31.

Figure 6A:
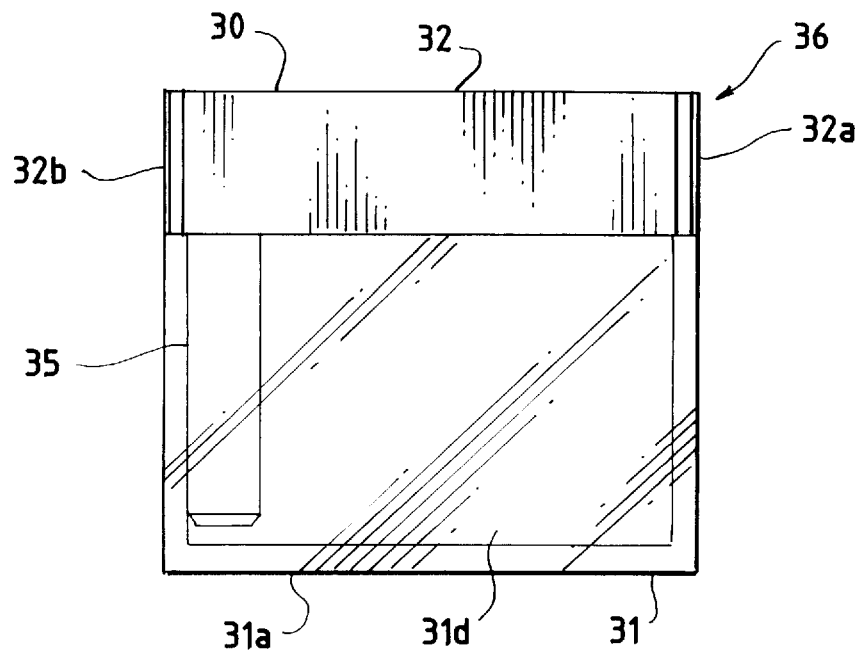
FIG. 6a is a direct side view of a wedge member.

As seen in FIG. 6a, in the preferred embodiment cylindrical rigid protruding component 35 fits firmly into slot 33 (not shown), thus forming attachment 36. However, cylindrical component 35 must not fit so tightly that wedge member 31 cannot slide relatively easily from one end 33a to opposite end 33b. See FIG. 6b.

Figure 6B:
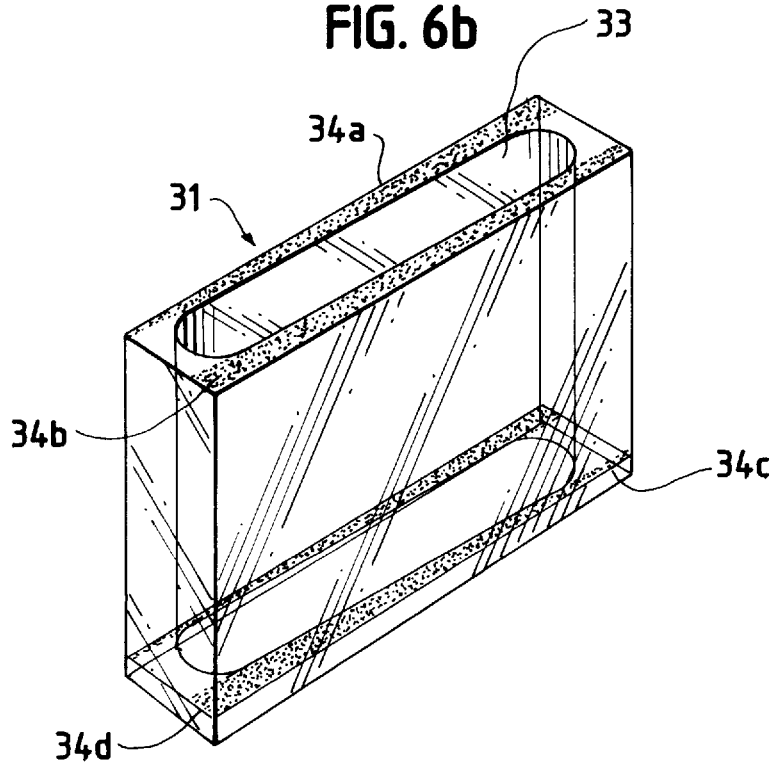
FIG. 6b is a three-quarters three-dimensional schematic view of a wedge member with slot.

As shown in FIGS. 6b and 5b, in the preferred embodiment slot 33 has rounded ends 33a and 33b which can snugly accommodate a cylindrical protruding component 35. Rigid cylindrical component 35 does not move—slot 33 does the "sliding."

Thus, wedge member 31, which accommodates rigid cylindrical component 35 in slot 33 can slide over component 35 from one rounded end 33a to the other rounded end 33b. FIG. 6b shows three-dimensional slot 33 and prismoidal wedges 34a, 34b formed thereby in wedge member 31. Each prismoidal wedge has an apex and a base.

FIG. 6a shows peg member 30 inserted into wedge member 31, thus forming attachment 36. As noted supra, there are two sets of ridges 32a and 32b at either end of segment 32. Ridges 32a and 32b can slide into and interlock with opposing ridges 27a, such ridges 27a being structurally part of depressions on lower surface 9.

FIG. 7 illustrates for the preferred embodiment, lower surface 9 of the planter box 2 in plan view. Depression ridges 27a mate or interlock with ridges 32a or 32b of straight segment 32, now part of attachment 36. Cylindrical component 35, snugly in slot 33, keeps wedge member 31 atop rectangular segment 32. When planter box 2 is lifted, each peg member 30 fits tightly inside circular depressions, and each wedge member 31 fits tightly over peg member 30. In this manner, the two components (attachment 36) do not fall from lower surface 9, because of (i) interlocking ridges and (ii) snugness of peg member 35 within slot 33.

Figure 8A:
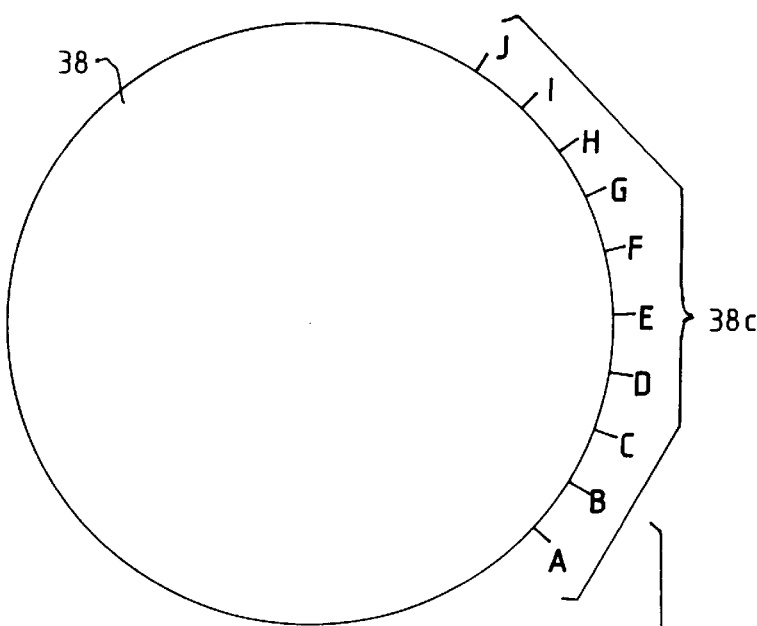
FIG. 8a shows a code of numbers and letters for opposing serrated depressions on either side of lower surface, and each depression adjacent a wall member.

FIG. 8a illustrates, in part, another embodiment comprising templates 37, 38 for use on lower surface 9, as well as codes 37a and 37b thereon. These coded templates effect macroadjustment of attachments 36 to wall member 40a. Specifically, the coded templates 37, 38 translate the width of a wall member 40a into the appropriate positions for interlocking of ridges 32a, 32b within planter box ridges 27a.

Insertion of attachments 36 at appropriate locations on lower surface 9 occurs by: (i) superimposing each template 37, 38 over opposing serrated (ridges 27a and valleys 27b) depressions 10a; and (ii) manually interlocking ridges 32a, 32b with ridges 27a by pressing ridges 32a, 32b downward into depression 10a. Ridges 27a are coded with either a number or a letter, as seen in FIG. 8a.

Template 37, 38 comprises a flat piece of paper comprising two circular apertures 37c, 38c. These apertures are positioned on the paper so (i) they are congruent with a set of opposing depressions 10a on either side of lower surface 9; and (ii) there are depressions 10a simultaneously positioned on respective sides of wall member a. Aperture 37c or 37c has a number or letter for each corresponding ridge 27a of a depression 10a.

Figure 8B:
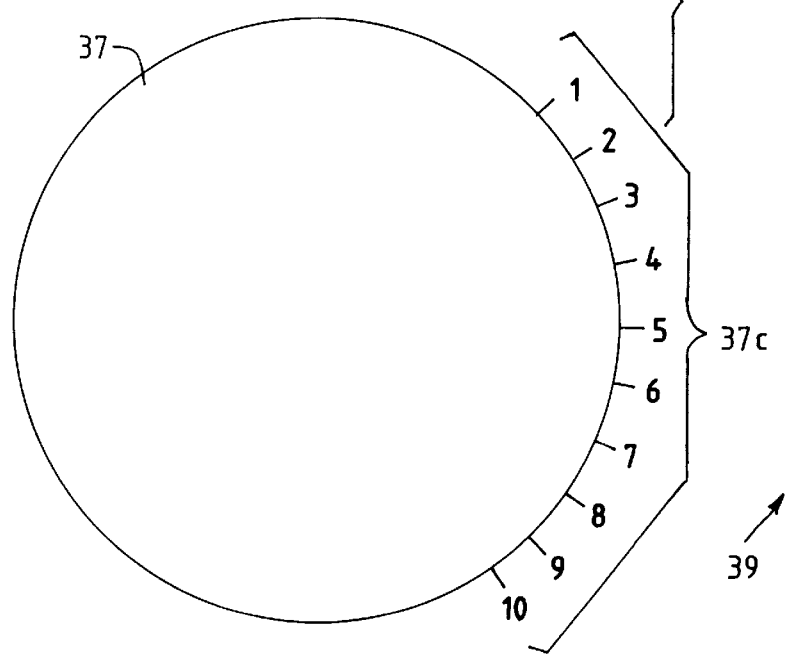
FIG. 8b is a chart correlating the width of a wall member with template codes designed for ridges within depressions.

FIG. 8b illustrates Table 39. In combination with templates 37, 38, it correlates the width of wall member 40a to the proper orientation of interlocking ridges 32a, 32b and ridges 27a.

Template 37, 38 are the result of experimentation. The letters and numbers refer to a particular ridge 27a on each paired circular depression. At a particular ridge 27a, peg member 30 fits a respective side of wall member 40a within one-eighth of an inch.

To initially secure a planter box 2 to a panel, cylindrical protruding component 35 is first manually placed into either end 33b or 33a to form attachment 36. Attachment 36 now has two sets of ridges 32a, 32b on either side 35c, 35d (from segment 32 of peg member 30.)

Next, the width of wall member 40a iscorrelated with Table 39 in FIG. 8b. Insertion of attachments 36 at appropriate locations on either side of wall member 40a occurs by: (i) superimposing each template over opposing serrated (i.e., comprising ridges and valleys) depressions; and (ii) manually interlocking ridges 32a, 32b with ridges 27a by pressing ridges 32a, 32b down into the depression (according to the templates and table). See FIG. 7.

For example, a wall member width of 3 and ¼ inches is code 7-G, according to Table 39. The operator first superimposes the template 38, 37 over the appropriate depressions 10a. The operator next manually places one attachment 36 with ridges 32a, 32b on either side of ridge 27a at position 7 of one depression 10a.

For the opposing depression 10c the operator places second attachment 36 on either side of ridge 27a on the second opposing depression 10a.

Figure 8C:
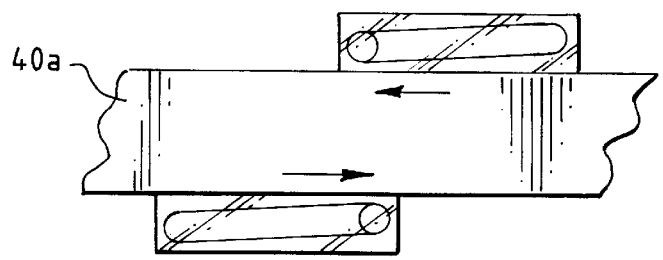
FIG. 8c is a diagrammatic instantaneous upper plan view of two attachments moving in opposing directions along respective sides of a wall member.

A coding scheme for a different range of wall member measurements can be created as follows: First, two peg members 30 of a first and second attachment 36 are interlocked in equivalent positions in each of two opposing depressions. A good place to start is always the serrated (ridges and valleys) positions which gives the tightest fit on either side of the partition. Please see FIG. 8c.

The operator manually superimposes template 37, 38 over the appropriate surface and then places four (4) attachments 36 into the circular depressions. Two of these four attachments 36 will be positioned with ridges 32a, 32b on either side of ridge 27a at position 7; and two will be positioned with ridges 32a, 32b on either side of ridge 27a at position G.

Next, a second linear measurement is taken between the two opposing apexes of prismoidal wedges nearest wall member 40a. Here, $2/16$ of an inch (or $1/8$) is subtracted from the measurement to accommodate wedge apexes 34c. Next, approximately $1/4$ inch (or $2/8$ inch), is subtracted from the measurement to accommodate the bases 34d of wedges 34a or 34b nearest wall member a.

These two numbers give the range of the partition width for these attachments 36 positions.

Next, the first attachment 36 is moved one ridge 27a further from respective sides of wall member a, or one ridge 27a from the site of the first measurement, as described above. The second attachment 36 remains at the site of the first measurement. Another linear measurement is taken, this time between the second site and the first site.

Again the measurements are first taken between innermost apexes with $1/8$ inch subtracted and then between wedge bases with $1/4$ inch subtracted. For the width of wall member a at these particular coded ridges 27a, there is again a range of values between the number with $1/4$ inch subtracted and the number with $1/8$ subtracted.

This procedure is repeated, now with the second attachment 36 held in the same position and a measurement taken as in the preceding description. Measurements are taken in alternating sequence, i.e., first attachment 36 is moved further one ridge while the second attachment 36 remains where it was. Then the second attachment is moved while the first attachment 36 remains.

It is important that each ridge 27a in each opposing depression must have a code designation; in the preferred embodiment, depending upon the depression it will either consistently be a number or a letter. However, many users do not use this method at all, preferring to find the correct positions for attachments 36 for a wall member by empirical trial and error.

The above discussion describes macroadjustment which brings attachments 36 within approximately one-eighth of an inch or less from each respective side of wall member 40a. Experimentation has shown that when attachment 36 is tightened, ridges 32a, 32b have a tendency to be forced from circular depressions 10a. Therefore, in the preferred embodiment, the depth of the circular depressions 10a in lower surface 9 is approximately $3/4$ inch for increased interlocking support.

As seen in FIG. 7, in the preferred embodiment, a tighter microfit originates from the prismoidal wedges 34a or 34b of at least one attachment 36. This occurs after attachment 36 is interlocked within lower surface 9 by ridges 32a, 32b and 27a.

Microadjustment is accomplished is as follows: Each prismoidal wedge 34a or 34b increases three-dimensionally in volume as it passes a specific point along wall member a, if such prismoidal wedge 43a or 43b is pushed forward from apex to base. See FIG. 8(c) and FIG. 7. In the preferred embodiment one manually pushes wedge member 31 along cylindrical component 35 which is within slot 33.

Again referring to FIG. 7, as wedge member 31 slot is pushed along peg member 30, prismoidal wedge volume and width, moving from apex to base, and proceeding linearly along the side of wall member 40a, becomes increasingly larger until wedge member 31 abuts tightly against wall member 40a. Moreover, when two wedge members 31 are pushed from opposing directions, balancing forces are generated by the juxtaposed prismoidal wedges. See FIG. 8c and FIG. 7. In fact, it may only be necessary to tighten one attachment 36 if another such attachment 36 is already abutting one respective side of wall member 40a.

When these juxtaposed prismoidal wedges 34a, 43b approach from opposite directions, moving from apex to base, the result is a firm grip of attachment 36 to partition a.

In sum, the preferred embodiment comprises the modified planter box and the novel attachments for gripping a wall member. In the preferred embodiment wedge members 31 containing prismoidal wedges 34a, 34b are easy to manually push. Moreover, the sides of each wedge member 31 are easily decorated. The prototype is relatively easy to hot stamp, a process well known to those skilled in the art of producing plastic objects.

What I claim is:

1. A panel planted adapted to rest upon a horizontal surface of a wall member, said panel planter comprising (A) a planter box, said planter box comprising:
  (1) a lower surface, said lower surface comprising a length and a width, the width extending between a first side and a second side, the length extending between a third side and a fourth side, said lower surface further comprising
    (a) at least one pair of depressions, each depression comprising ridges and valleys around the perimeter thereof, each said pair of depressions consisting of two depressions located side by side on said lower surface along said length at approximately the same distance from said third side and said fourth side, one of said depressions located closer to said first side than said second side;

(B) attachments for attaching said planter box to said wall member, each said attachment comprising
  (1) at least one pair of peg member, each said peg member comprising
    (a) an upper section, said section fitting into a respective said depression of said pair of depressions to frictionally mate with said ridges and valleys of said depression, and
    (b) a lower member which extends downwardly below said lower surface,
    whereby, when said pair of peg members are installed in a respective pair of depressions, said lower members are separated along said width by a distance greater than the width of said wall member;
  (2) at least one pair of wedge members, each said wedge member further comprising:
    a block of material with a vertically oriented slot therethrough which can slidably receive a respective lower member, and a flat surface adapted to contact a side of said wall member, one end of said slot closer to said flat surface than another end, whereby a wedge member is initially engaged with a respective lower member so that said lower member is located in the end of the slot closer to said flat surface and the flat surface is located a distance from said wall member, and the wedge member may be slid along the lower member toward the other end of the slot, causing the wedge member flat surface to contact the wall member and frictionally hold the planter box in place.

2. A panel planter adapted to rest on a horizontal surface of a wall member with respective sides, said panel planter comprising in combination:

a box, said box having an upwardly open end and comprising a floor, said floor comprising an upper and a lower surface, said lower surface comprising a length and a width, the width extending between a first side and a second side, the length extending between a third side and a fourth side, at least one pair of depressions said depressions recessed within said lower surface of said floors said depressions comprising shallow cavities with continuous walls, said depressions opening outwardly from said lower surface, said depressions further comprising serrations, said serrations comprising ridges and valleys, said ridges and valleys comprising an integral structural component of perimeters of said depressions, each said pair of depressions consisting of two depressions located side by side on said lower surface along said length at approximately the same distance from said third side and said fourth side, one of said depressions located closer to said first side than said second side;

attachments for affixing said planter box to said wall member, each said attachment comprising at least one pair of peg members, each said peg member comprising a rigid rectangular segment comprising a first end and a second end, said rectangular segment further comprising ridges and valleys at said first end and said second end, said ridges and valleys comprising integral physical components of said rectangular segments, said ridges and valleys fitting into said depressions to frictionally mate or interlock with said ridges and valleys comprising said perimeters of said depressions, a protruding cylindrical rigid component attached at a right angle to said rectangular segment at said first end which extends downwardly below said lower surface, whereby, when said pair of peg members are installed in a respective pair of depressions, said cylindrical components are separated along said width by a distance greater than the width of said wall member;

at least one pair of wedge members, each said wedge member comprising a block of material comprising first and second sides, a top, a bottom, and third and fourth flat parallel sides, said third flat side adapted to contact a side of said wall member, said wedge member further comprising a slot which can slidably receive a respective cylindrical component, said slot having a first end and a second end, said slot further comprising a first face and an opposing second face, said opposing faces being parallel to each other, said slot extending from above said bottom, said slot opening upwardly through said top, one end of said slot closer to said third flat side than another end whereby a wedge member is initially engaged with a respective cylindrical component so that said cylindrical component is located in the end of the slot closer to said third flat side and the third flat side is located a distance from said wall member, and the wedge member may be slid along the cylindrical component toward the other end of the slot, causing the wedge member third flat side to contact the wall member and frictionally hold the planter box in place.

3. The panel planter as described in claim 2 wherein said floor is approximately 1.0 inch in thickness, and wherein (A) said first and second sides are parallel to each other and said third and fourth sides are parallel to each other, (B) said depressions being circular in shape, said depressions being approximately ¾ inch in depth and ¾ inch in diameter, (C) each said ridge of a peg member being approximately 1/10 inch in width and each said ridge of a depression being approximately 1/10 inch in width, (D) said first, second, third, and fourth sides each being approximately seven inches in height, (E) said third and fourth sides each being approximately twenty-five inches in length.

4. The panel planter as described in claim 2 wherein, (A) said box is rectangular in shape, (B) said depressions being eight in number, each said depression recessed perpendicularly to said lower surface, (C) said ridges and said valleys extending from said recessed lower surface to said outward openings of said depressions (D) said slot comprising a first rounded end and a second rounded end, (E) said protruding cylindrical rigid components each having a lower end with a flat surface, (F) said box comprising eight upwardly protruding circular areas on said upper surface of said floor, (G) said floor comprising a plurality of strips protruding from said upper surface, (H) a template, said template comprising:

(1) a flat member with two apertures, said apertures congruent with one pair of said depressions, said flat member including markings around the periphery of each depression for indicating an insertion angle for a peg member;

(2) a table or chart for indicating an insertion angle for each peg member, based on the width of said wall member, said insertion angle correlated with said markings on said flat member such that, when peg members are installed in said depressions at said indicated angles and said planter box is placed on said wall member, said lower members will not grip the sides of the wall member tightly, but when the wedge members are slid along the lower members, the wedge members will grip the sides of the wall member to hold the planter box in place.

5. The panel planter as described in claim 4 wherein said marking around the periphery of each depression include markings that correspond to a predetermined minimum wall member width, a predetermined maximum wall member width, and intermediate wall member widths.

6. The panel planter as described in claim 5, wherein:
(A) said markings around the periphery of one depression of said pair of depressions comprise numbers, and the markings around the periphery of the other depression of said pair of depressions comprise letters,
(B) said table or chart indicating a number-letter combination based on a selected width of said wall member, such that a user is instructed to insert a peg member into one depression of said pair of depressions in alignment with said indicated number, and to insert a peg member into the other depression of said pair of depressions in alignment with said indicated letter.

* * * * *